Figures 1, 2:
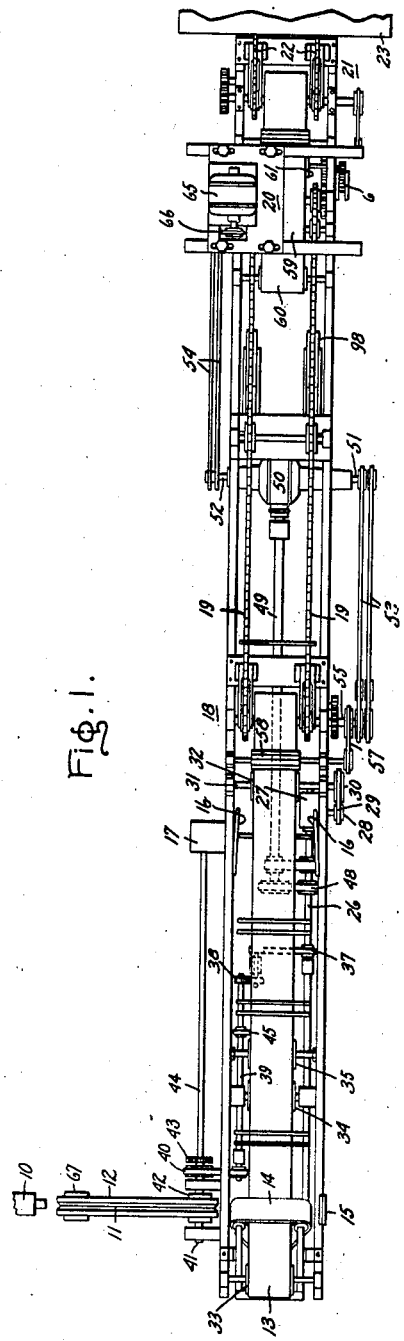

June 1, 1943.  W. H. ROBINSON ET AL  2,320,797
CONVEYER SYSTEM
Original Filed Jan. 20, 1940  2 Sheets-Sheet 1

Inventors:
William H. Robinson,
Jasper E. Anderson,
by Harry E. Dunham
Their Attorney.

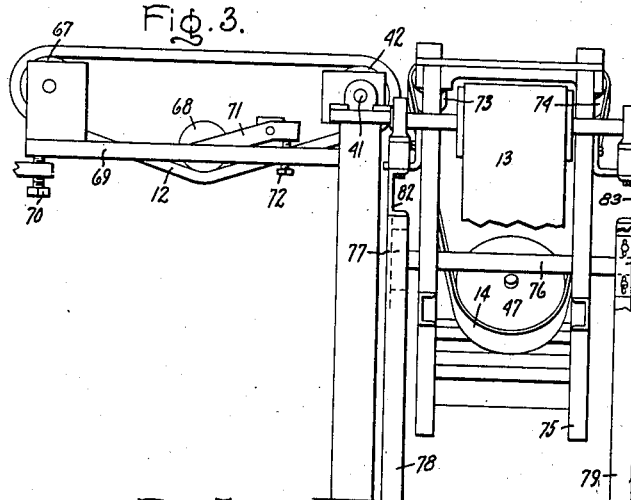

Patented June 1, 1943

2,320,797

UNITED STATES PATENT OFFICE 2,320,797

CONVEYER SYSTEM

William H. Robinson, Schenectady, N. Y., and Jasper E. Anderson, Saugus, Mass., assignors to General Electric Company, a corporation of New York Original application January 20, 1940, Serial No. 314,830. Divided and this application March 25, 1941, Serial No. 385,070

3 Claims. (Cl. 198—20)

This application is a division of our application Serial No. 314,830, filed January 20, 1940.

Our invention, forming the subject matter of this divisional application, relates to conveyer systems for rod-like articles and more particularly to means for transferring flux-coated electrodes from an extrusion machine to a second transfer means by which they are aligned, spaced, and fed to an abrading machine which removes an end portion of their coating.

It is an object of our invention to provide improved means for lengthwise separating rod-like articles delivered to a conveyer system in end-to-end succession and thereafter changing their lengthwise movement into sidewise movement.

Further objects of our invention will become apparent from the following description of the conveyer system of our parent application which is illustrated in the attached drawings, Figs. 1 and 2 of which are top and side views thereof; Figs. 3 and 4 of which are end and side detail views of the mechanism employed for changing the lengthwise movement of a succession of electrodes into sidewise movement thereof; and Figs. 5, 6 and 7 of which are side, end sectional (along lines 6—6 of Fig. 5) and plan views respectively of a transfer mechanism forming part of the conveyer system.

One of the most convenient ways of applying heavy coatings to arc welding electrodes is through the agency of an extrusion machine. The cores of the electrodes are supplied to the extrusion machine in continuous succession with their ends abutting one another and as they pass through the extrusion machine a shell of the coating material is applied to them. This coating material connects the successive rods and the first operation of the conveyer system illustrated in the drawings is to separate the electrodes lengthwise of one another after they leave the nozzle of the extrusion machine. Thereafter this conveyer system changes the lengthwise movement of the coated electrodes into a sidewise movement and transfers the electrodes in parallel spaced aligned relationship through a stripping machine which removes a portion of the flux coating from their ends after which this system conveys the electrodes into an oven where they are baked to set and harden their coatings. The coatings on the electrodes before being set and hardened by baking are soft and plastic and a satisfactory conveyer system must be capable of handling these freshly coated electrodes without destroying or marring the uniformity of their coatings. The conveyer system illustrated in the drawings successfully accomplishes this result.

As shown in Figs. 1 and 2, the coated electrodes are discharged from the nozzle 10 of an extrusion machine in end-to-end succession lengthwise of the longitudinal groove 11 in the endless belt 12 forming part of the conveyer system. By lengthwise grooving belt 12, the electrodes are retained along the central portion of its article-carrying surface without using auxiliary guiding arrangements which might mar or destroy the uniformity of the flux coatings which are in a plastic condition as the electrodes leave nozzle 10 of the extrusion machine. The peripheral speed of belt 12 is greater than the speed at which the electrodes issue from nozzle 10 of the extrusion machine, and consequently, this belt operates to lengthwise separate the electrodes as they are discharged thereon.

Belt 12 is spaced from a second endless belt 13 having a travel such that a longitudinal portion of its article-carrying surface is transverse to the discharge end of belt 12 and the electrodes are transferred from belt 12 to belt 13 through the agency of a third endless belt 14 having a travel such that a longitudinal portion of its article-carrying surface is inclined to and extends across belt 13 in line with belt 12. The arrangement is such that electrodes discharged from belt 12 engage the inclined surface of belt 14, strike a target or abutment 15 on the side of belt 13 opposite the discharge end of belt 12 and, after their lengthwise movement has thus been arrested, fall upon belt 13 in side-by-side relationship. The spacing of the electrodes on belt 13 depends, of course, upon the relative speeds of belts 12 and 13. Means may be provided for adjusting the relative speeds of these belts.

As the electrodes travel along belt 13, they engage a pair of inclined guides 16 which are oscillated transversely of the belt by an oscillating mechanism enclosed within a box 17. These guides by engaging the ends of the electrodes on belt 13 align the electrodes before they are discharged from belt 13 into a mechanism 18 which transfers them from belt 13 onto a pair of parallel conveyer chains 19.

Each chain 19 is provided with longitudinally spaced projections which are aligned with the projections of the other chain and the electrodes are placed in parallel relationship by the transfer mechanism 18 on these chains between their projections. These chains transport the electrodes to a stripper 20 which removes a portion of the end coating of each electrode as it passes therethrough. The electrodes are then discharged from the stripper into another mechanism 21 which transfers them onto another pair of parallel chains 22 constructed and arranged in the same way as chains 19 for carrying the electrodes into and through an oven 23 which bakes the coatings thereon.

Except for the parallel chains 22 and the transfer mechanism 21 operated thereby, the various parts of the conveyer system illustrated in Figs. 1 and 2 are driven by a motor 24. This motor is connected through a variable speed mechanism 25, such as the Reeves drive, to a main shaft 26. This shaft extends through a speed reducer 27 having an output shaft and pulley 28 which is connected by a belt 29 to a driving pulley 30 which is on the same shaft 31 as the driving drum 32 for belt 13 which also passes over idler drums 33, 34 and 35. Drum 34 is adjustably supported in a frame 36 and serves as a belt tightener.

Shaft 26 is also connected through a transmission including a belt 37, gears 38, a shaft 39 and a belt 40 with a shaft 41 which drives one of the pulleys 42 over which belt 12 passes. Shaft 41 is connected through gears 43 with a shaft 44 which is connected to and operates the oscillating mechanism for the vibrating aligning guides 16 above referred to. Shaft 26 also drives through a transmission including belt 37, gears 38, shaft 39, a belt 45 and a flexible shaft 46, a driving pulley 47 for belt 14. The flexible shaft 46 may be replaced by rigid shafts connected by a universal coupling.

Shaft 26 is also connected to chains 19 through a transmission including a belt 48 and the input shaft 49 of a differential 50 having output shafts 51 and 52 connected through chains 53 and 54 to the driving shafts 55 and 56 on which the drive wheels or sprockets for chains 19 are located. Drive shaft 55 for chains 19 also operates through a transmission including a belt 57 to rotate a paddle wheel 58 forming part of the transfer mechanism 18. Drive shaft 56 for chains 19 also operates through suitable transmissions to propel the belts 59 and 60 forming part of the stripper mechanism 20. Belt 60 is propelled by driving one of its pulleys 61 through a transmission including sprockets and a chain 62 and belt 59 is propelled by driving one of its pulleys 63 through a gear transmission 6. The belts 59 and 60 travel at slightly different speeds so that as the electrodes are discharged from the parallel chains 19 onto the belt 60, they are rotated about their longitudinal axes as they pass between belts 59 and 60. It will be noted that the directions of travel of the chains where they cross the belt 60 are such that transfer of electrodes from between projections on chains 19 to the belt 60 occurs without any interference from these projections.

In the stripper 20 a cylindrical wire brush 64 engages and removes from the ends of the electrodes a portion of their coatings as they pass between belts 59 and 60. This brush is driven by a motor 65 connected thereto through a transmission including belt 66. The axis of rotation of brush 64 is parallel to the paths of travel of the electrodes between the belts 59 and 60 and may be placed at an angle to the direction in which the electrodes are moving so as to remove any desired length of coating on the ends of the electrodes without having to set the brush so that its circumference extends below the thickness of the coatings on the electrodes. This latter adjustment may be used, however, in which case the longitudinal axis of the brush is set parallel to the direction of travel of the electrodes.

In the arrangement illustrated, the ends of the electrodes which are clamped in electrode holders for support and supply of welding current thereto are cleaned by brush 64. It is, of course, apparent that the arcing end of the electrode may also be cleaned by a brush suitably mounted although in the particular conveyer system illustrated, the impact of the electrodes on the target or abutment 15 is sufficient to remove coating material from the end of the electrode that makes arcing engagement with the work in performing an arc welding operation.

Figs. 3 and 4 are enlarged views of that portion of the conveyer system which lengthwise separates the electrodes and changes their lengthwise movement into sidewise movement. It is this part of the conveyer system that forms the subject matter claimed in this application. As shown in these views, belt 12 passes about pulleys 42, 67 and 68. As previously pointed out, pulley 42 is the driving pulley. These pulleys are supported in a framework 69 which is pivoted about the driving shaft 41 for the pulley 42. The inclination of the article-carrying surface of belt 12 relative to nozzle 10 of the extruding machine is controlled by a support provided with set screws 70 which engage the free end of the swinging frame 69. The pulley 68 is supported between two arms 71 pivoted intermediate their ends to a portion of the frame 69 and set screws 72 located in the frame engage these arms on the sides opposite the pivot from the pulley 68 so as to apply the desired tension to belt 12. As previously noted, this belt is provided with a lengthwise groove for retaining the electrodes thereon. It is preferably made of some soft material such as sponge rubber and is of suitable thickness to provide a groove which will effectively retain the electrodes deposited therein.

As also shown in Figs. 3 and 4, transfer belt 14 passes over its driving pulley 47 and about idler pulleys 73 and 74. These pulleys are mounted on shafts supported by a framework 75 which is pivotally supported on a shaft 76 whose ends are mounted in bearings 77 which are located for vertical adjustment on legs 78 and 79 of the main frame of the conveyer system. Frame 75 is held in adjusted position by bolts 80 which pass through slotted brackets 81 mounted on the horizontal members 82 and 83 of the main frame of the conveyer system. By reason of the method of supporting frame 75 in the main frame of the conveyer system, it is apparent that the position and angularity of that portion of belt 14 which travels across belt 13 may be suitably adjusted to receive electrodes discharged from belt 12 and direct them against abutment or target 15 from which they drop onto belt 13 after their lengthwise motion has been arrested.

The transfer mechanism 18 previously referred to in describing Figs. 1 and 2 is illustrated in detail in Figs. 5, 6 and 7. This mechanism and the parts associated therewith form the subject matter claimed in our above-referred to parent application.

At the discharge end of belt 13, the electrodes fall upon inclined guides 84 and are transferred to the discharge end of these guides by the flexible rubber flaps of paddle wheel 58 which is driven by sprockets and chain 57 from the shaft 55. A cylinder 85 having in its periphery parallel slots which pass in succession past the discharge ends of guides 84 transfers the electrodes from these guides to the parallel chains 19 located on each side of it. Cam surfaces 86 associated with the periphery of the cylinder in the vicinity of the discharge end of guides 84 ejects all but one electrode from each of the slots therein.

Chains 19 are directed in paths of travel past the ends of the cylinder 85 from below to above the slots therein so that the projections on these chains pick up one at a time the electrodes supplied by the slotted cylinder. The paths of travel of these chains are determined by the adjustment of pulleys 87 mounted in the ends of one of the arms of cranks 88 whose other arm is supported between set screws 89. Cranks 88 are pivotally supported on shafts 90 and by adjusting the set screws 89, these cranks may be moved to position the pulleys 87, and consequently, the chains 19 which pass over these pulleys. A further adjustment is provided by mounting the support for the cranks 88 on a plate 91 which is adjustable lengthwise of the frame of the conveyer system through the agency of set screws 92.

The slotted cylinder 85 is propelled through gearing connecting its shaft 93 with shaft 55 which is driven by chains 53 from the differential 50. The last gear 94 in this gear train is adjustably connected through a spider 95 to the shaft 93. As indicated in the drawings, adjustments are provided so that the spider 95 may be rotatably adjusted relative to the gear 94 with which it is connected. By reason of this adjustment, the slots in the cylinder 85 may be made to match with the spaces between the projections on the chains 19. The gear transmission between drive shaft 55 and shaft 93 of the cylinder 85 is such that the peripheral speed of the cylinder is the same as the speed of travel of chains 19 as they pass from below to above the slots in the cylinder. Chains 19 are synchronized with one another by their drive wheels or sprockets mounted in shafts 55 and 56 so that their projections are aligned with one another to hold the electrodes supported on the chains in parallel relationship.

It is thus apparent that the construction and organization of the transfer mechanism shown in Figs. 5, 6 and 7 is such as to receive electrodes that have been aligned on belt 13 and feed them in parallel spaced relationship between the projections on chains 19 without in any way marring or indenting the plastic coatings thereon.

As previously noted, the same kind of a transfer mechanism 21 is employed for transferring the electrodes from stripper 20 to the parallel chains 22 by means of which the electrodes are traversed through the oven in which they are baked.

Chains 19 by means of which the electrodes are fed in aligned, parallel, spaced positions to the stripper 20 are propelled, as pointed out above, by sprockets or driving wheels mounted on drive shafts 55 and 56 which are connected through differential 50 to the main shaft 26 of the conveyer system. By using this differential drive, chains 19 are driven at points dividing their length in substantially equal portions, and consequently, the amount of power applied to the chains at their driving points is suitably divided so that the strength of the chains or the number of driving wheels employed may be kept at a minimum. Furthermore, by employing the differential drive, difficulties from back-lash in the chains are minimized. The direction of travel of chains 19 where they cross belt 60 of the stripper is determined by idler pulleys 96 and 97. Idler pulleys 98 adjustably mounted on the main frame of the conveyer system are also provided for tensioning the chains.

In place of belts 12, 13 and 14 and chains 19 and 22, any suitable endless flexible conveyer of similar construction may be employed. We prefer to employ a chain of the construction illustrated and described in our United States Letters Patent 2,144,547, granted January 17, 1939, and assigned to the same assignee as this invention.

Our invention has been described in connection with a particular conveyer system particularly suited for conveying flux coated electrodes through certain processing steps employed in their manufacture. It is, of course, apparent that other conveyer systems embodying its characteristic features are suited for transporting and positioning other rod-like articles. Many variations and modifications of our invention will occur to those skilled in the art in view of the above description of one embodiment thereof, and it is intended in the appended claims to cover all such variations and modifications as come within the true spirit and scope of our invention.

What we claim as new and desire to secure by Letters Patent of the United States is:

1. A conveyer system comprising an endless belt, means for discharging rod-like articles in end-to-end succession lengthwise of said belt, a second endless belt having a travel such that a longitudinal portion of its article-carrying surface is transverse to and spaced from the discharge end of said first-mentioned belt, a third endless belt having a travel such that a longitudinal portion of its article-carrying surface is inclined to and extends across said longitudinal portion of said second-mentioned belt in line with said first-mentioned belt, an abutment on the side of said second-mentioned belt opposite the discharge end of said first-mentioned belt and in line with the travel of said longitudinal portion of said third-mentioned belt across said second-mentioned belt and means for propelling said belts, said first-mentioned belt and said third-mentioned belt being propelled at speeds such that said articles on said first-mentioned belt are discharged lengthwise onto said longitudinal portion of said third-mentioned belt and are propelled by said third-mentioned belt into impactive engagement with said abutment before they fall upon said longitudinal portion of said second-mentioned belt in side by side relationship.

2. A conveyer system comprising an endless belt, means for discharging rod-like articles in end-to-end succession lengthwise of said belt, a second endless belt having a travel such that a longitudinal portion of its article-carrying surface is transverse to and spaced from the discharge end of said first-mentioned belt, a third endless belt having a travel such that a longitudinal portion of its article-carrying surface is inclined to and extends across said longitudinal portion of said second-mentioned belt in line with said first-mentioned belt, an abutment on the side of said second-mentioned belt opposite the discharge end of said first-mentioned belt and in line with the travel of said longitudinal portion of said third-mentioned belt across said second-mentioned belt, means for propelling said belts, said first-mentioned belt and said third-mentioned belt being propelled at speeds such that said articles on said first-mentioned belt are discharged lengthwise onto said longitudinal portion of said third-mentioned belt and are propelled by said third-mentioned belt into impactive engagement with said abutment before they fall upon said longitudinal portion of said second-mentioned belt in side by side relationship, and means for adjusting the angle of inclination of said longitudinal portion of said third-mentioned belt which extends across said second-mentioned belt and thereby controlling the transfer of said articles from said first-mentioned belt to said second-mentioned belt.

3. A conveyer system comprising an endless belt with a longitudinal groove in its article-carrying surface, means for discharging articles in end-to-end engagement lengthwise of the groove in said belt, a second endless belt having a travel such that a portion of its article-carrying surface is transverse to and spaced in substantially the same plane as the discharge end of said first-mentioned belt, a third endless belt having a travel such that a portion of its article-carrying surface is inclined to and extends across said second-mentioned belt in line with said first-mentioned belt, means for adjusting the angle of inclination of the portion of said third-mentioned belt which extends across said second-mentioned belt, an abutment on the side of said second-mentioned belt opposite the discharge end of said first-mentioned belt and in line with the travel of said third-mentioned belt across said second-mentioned belt, means for propelling said first-mentioned belt at a speed greater than the speed at which said articles are supplied thereto, means for propelling said third-mentioned belt at a speed such that articles discharged from said first-mentioned belt upon engaging said third-mentioned belt are propelled into engagement with said abutment, and means for propelling said second-mentioned belt at a speed suitable for laterally spacing said articles as they fall from said abutment after their lengthwise movement has been arrested thereby.

WILLIAM H. ROBINSON.
JASPER E. ANDERSON.